United States Patent [19]

Dubreuil

[11] 3,739,804
[45] June 19, 1973

[54] CONNECTING DEVICE FOR FLUID-CIRCUIT
[75] Inventor: Serge Dubreuil, 78 Chatou, France
[73] Assignee: Societe S.B.F., Courbevoie, France
[22] Filed: Oct. 28, 1971
[21] Appl. No.: 193,243

[52] U.S. Cl. .............................................. 137/269
[51] Int. Cl. ........................... F16l 29/00, F16k 5/06
[58] Field of Search .................. 137/269, 271, 315; 251/28, 368

[56] References Cited
UNITED STATES PATENTS

| | | | |
|---|---|---|---|
| 2,917,273 | 12/1959 | Best | 137/269 X |
| 3,192,943 | 7/1965 | Moen | 137/271 X |
| 3,198,034 | 8/1965 | De Witte et al. | 137/269 X |
| 3,563,265 | 2/1971 | Graham | 137/269 |
| 1,733,421 | 10/1929 | Mauran | 137/271 X |
| 3,117,587 | 1/1964 | Willinger | 137/271 X |
| 3,373,763 | 3/1968 | Smilges et al. | 137/269 |

*Primary Examiner*—Henry T. Klinksiek
*Assistant Examiner*—Robert J. Miller
*Attorney*—William B. Kerkam, Jr.

[57] ABSTRACT

The device is constituted by a support having an open-ended central recess of polygonal or circular cross-section, radial passageways which are at least equal in number to the fluid-circuit elements such as pipes or valves and provided with connecting means, a removable core which is inserted in the recess and provided with ducts which communicate with the radial passageways, changing of the core being permitted without disassembling the fluid-circuit elements.

5 Claims, 6 Drawing Figures

United States Patent [19]
Dubreuil
[11] 3,739,804
[45] June 19, 1973
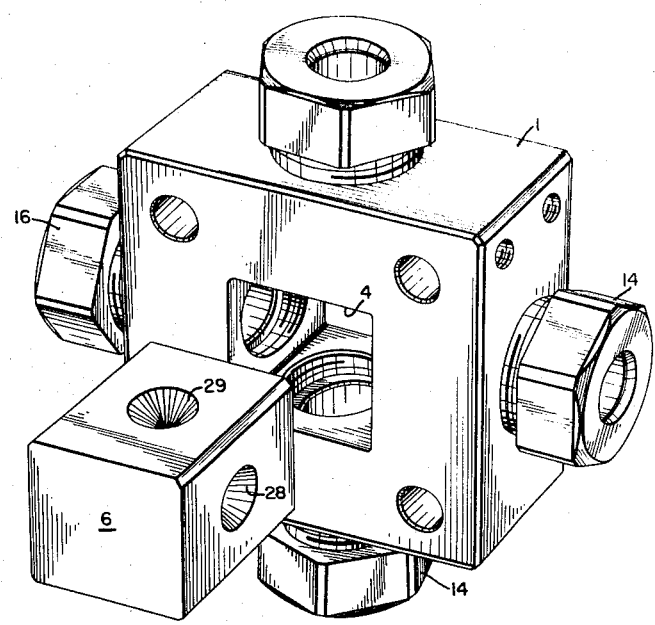

Patented June 19, 1973

CONNECTING DEVICE FOR FLUID-CIRCUIT

Present-day trends in engineering practice are such that hazardous fluids and more particularly corrosive fluids are coming into increasingly widespread use. It is none the less a fact that, although ducts or piping systems which afford adequate resistance to these fluids can be manufactured by known methods, the connection of such piping systems still gives rise to major problems. In particular, connecting devices must be machined with precision and retain this precision even when in contact with the corrosive fluid over long periods of time; this in turn makes it necessary to fabricate said devices from special and therefore costly materials such as stainless steel.

The high unit-price of these connecting devices is particularly objectionable in the case of industrial or laboratory facilities and in particular in assemblies which are intended to be modified at relatively frequent intervals. Moreover, it is necessary in that case to make provision for a large number of connectors corresponding to the different fluid-circuits to be established, to carry out a complete disassembly operation each time and to instal a new branch-pipe system which entails the need to modify pipe-connections.

The aim of this invention is to overcome these disadvantages by means of a connector which can be produced at a low unit-price and which can also be readily modified in order to change interconnections between pipes without any need for disassembly of piping systems which are already connected to the supply.

Said connecting device for fluid-circuits is consituted by a support pierced by a central recess of polygonal or circular cross-section which is open at both ends, radial passageways which have their openings in said recess being provided with means for securing the elements of the fluid-circuit and being at least equal in number to said elements, and by a removable core which is inserted into said recess and pierced by ducts for providing a communication with the radial passageways which correspond to the elements to be connected.

The constructional design of the device in two separate sections, namely the support and the core, makes it possible to fabricate said device from two different materials. The support is in fact in contact only with the outer walls of the pipes or other elements of the fluid-circuit whilst the core is in contact with the fluid which passes through this latter. Only the core is therefore liable to be attacked when the fluid is corrosive and, in consequence, the core alone must be formed of a material having good corrosion resistance properties, namely a costly material.

Moreover, the uniform shape of the central recess and the simple insertion of the core make it possible to change the fluid-circuit solely by modifying the position of said core or by replacing this latter. Cores having identical external shapes but pierced by ducts of different types are in fact readily interchangeable.

The different properties and advantages of the invention will become more clearly apparent from the following description of embodiments which are given by way of non-limitative example and illustrated in the accompanying drawings, in which.

Figure 1:
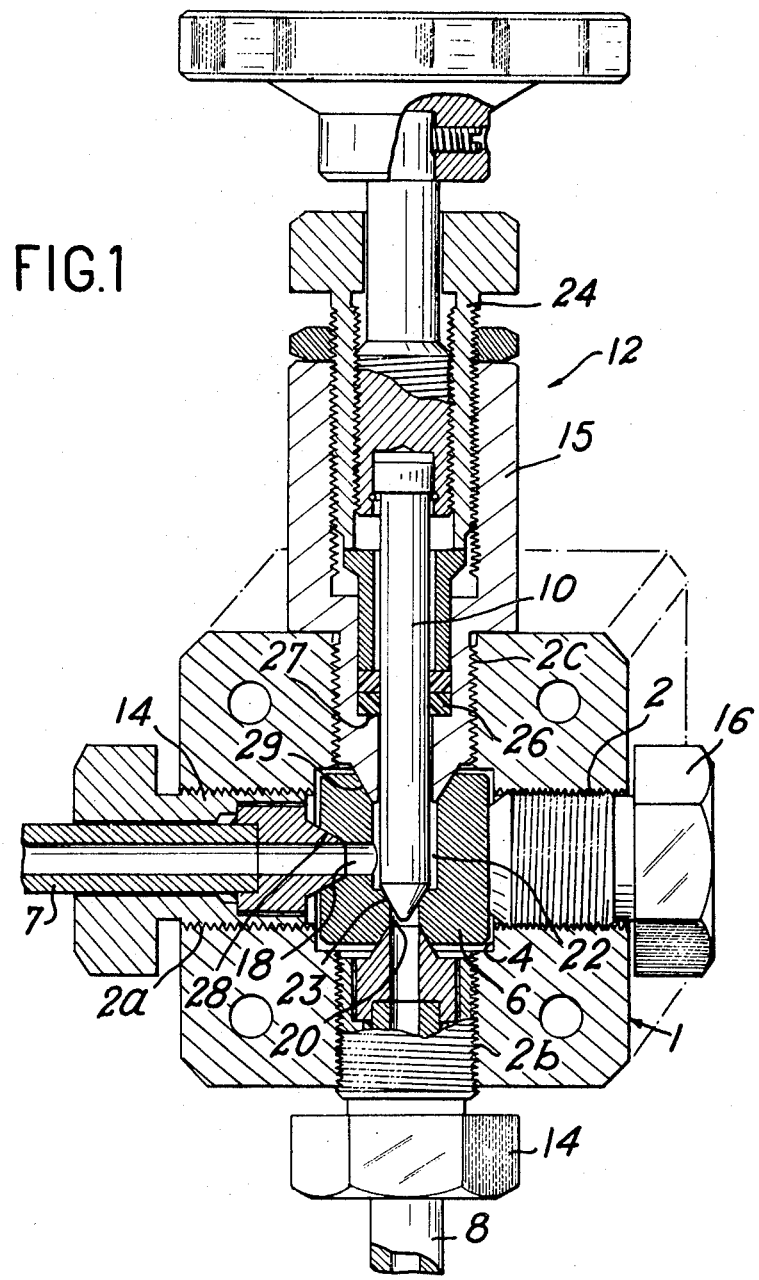
FIG. 1 is an axial sectional view of a connecting device which is mounted between a valve and two pipes.
Figure 2:
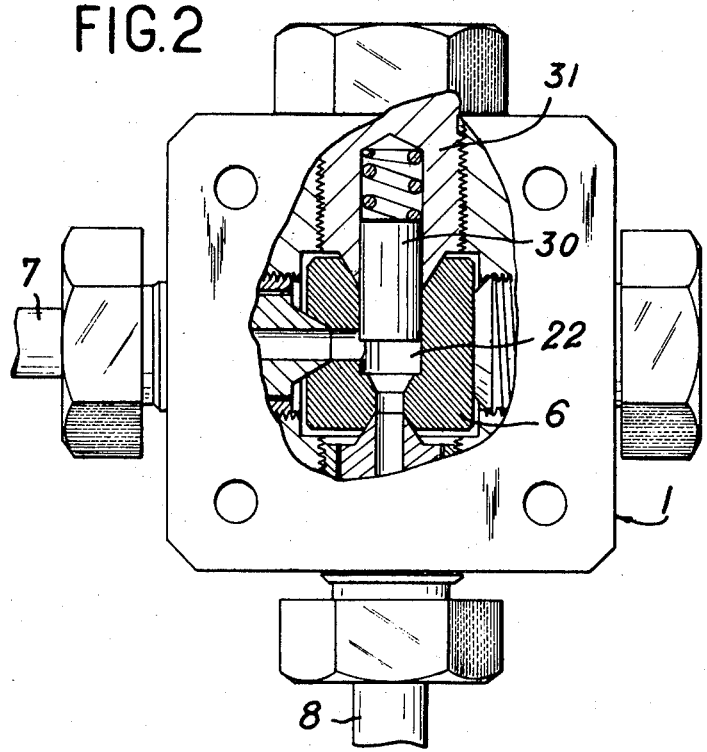
FIG. 2 is an external cutaway view of the same connecting device which is mounted between a check valve and two pipes.
Figure 6:
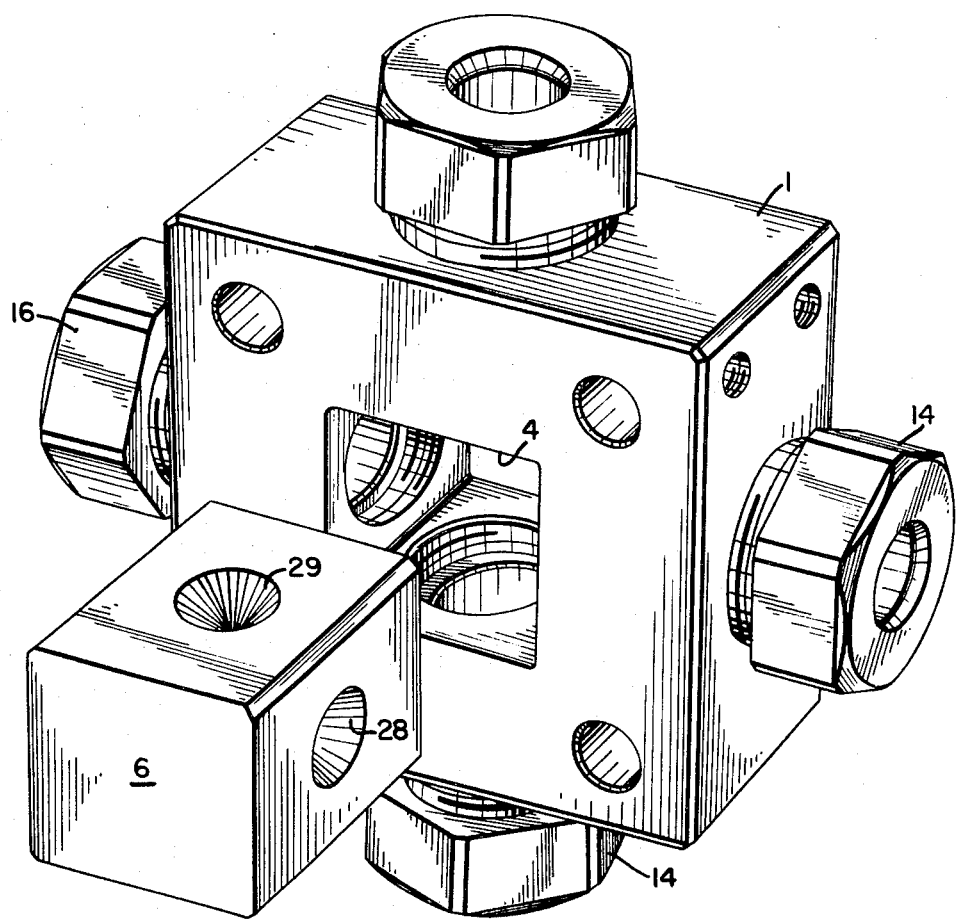
FIG. 6 is a perspective view of the connecting device with the core removed.

In the exemplified embodiment which is illustrated in the drawings, the connecting device is constituted by a parallelepipedal support 1 having a central recess 4 which passes right through the support so that a core may be inserted therein as seen in FIG. 6 and which has a cross-section in the shape of a regular polygon, namely a square in the case of FIGS. 1 and 2. An internally threaded bore 2 is formed in each side of said parallelepiped and has its opening in the central recess, thus forming a radial passageway for supporting a fluid-circuit element such as a pipe, for example.

A removable core 6 of prismatic shape is inserted into the recess 4 (FIG. 6) and the base of said core has preferably the same shape as the cross-section of said recess. In the case of FIGS. 1 and 2, the core is constituted by a prism having a square base and is thus permitted to conform exactly to the shape of said recess 4. Said core 6 is pierced by ducts which serve to establish a communication with at least a number of radial passageways 2. The arrangement and number of said ducts are determined as a function of the form of fluid-circuit to be established.

By way of example, in order to provide a connection between two pipes 7 and 8 and the pintle 10 of a valve 12, the two pipes are mounted (as shown in FIG. 1) within two adjacent radial bores or passageways 2a, 2b by means of threaded end-fittings 14 and the body 15 of the valve 12 is mounted within a third radial bore or passageway 2c. The fourth bore 2 is sealed-off by means of a plug 16. The core 6 which is inserted at the center of the support 1 is provided in that case with two ducts 18, 20 having axes at right angles to each other and each forming an extension of one of the pipes 7 and 8, both ducts being intended to open into a third duct 22 of larger diameter which in turn forms an extension of the passageway 2c. Said duct 22 is coaxial with the duct 20 and is connected to this latter by means of a conical valve-seat 23. The valve-pintle 10 projects beyond the body 15 and penetrates into the duct 22 in order to close the bore 20 if necessary by bearing on said valve-seat 23.

The displacement of the pintle within the body 15 is guided by a sleeve 24 which serves to compress a packing-gland 26 between the pintle 10 and an annular shoulder 27 of the body 15 in order to remove any danger of leakage around the pintle either during opening or closure of the valve.

The cylindrical body 15 is screwed into the bore 2c in the same manner as the end-fittings 14 and terminates in a similar conical portion 28 which is engaged in leak-tight manner in the flared ends 29 of the ducts 18, 20 and 22.

Clamping of said cones 28 within said duct openings 29 makes it possible by means of a metal-to-metal joint, for example, to ensure strict leak-tightness between the fluid-circuit element such as a pipe or valve and the core. Irrespective of the type of fluid which circulates within the pipes 7 and 8, said fluid is therefore never in contact with the support 1 itself but only with the core 6 within the ducts 18, 20 and 22. In consequence, said core must alone be constituted by a material which is capable of affording resistance to corrosion and can be formed of stainless steel, for example, whilst the support 1 is formed of ordinary steel.

The only costly portion of the connector is therefore the core 6 but the volume of this latter is small in comparison with the complete connector assembly.

Fabrication is further simplified by the fact that the radial passageways and ducts are formed within separate components.

Further types of connection can readily be obtained in the same manner, for example, by replacing the valve 12 with a check valve of the type shown at 30 in FIG. 2. The core 6 has the same design as in the previous case and is disposed in a similar manner. Said core provides a connection between the two pipes 7 and 8 and an end-fitting 31 which supports the valve 30.

Figure 3:
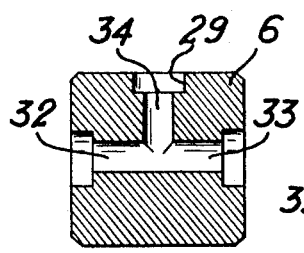
FIGS. 3, 4 and 5 show different arrangements of ducts in which are pierced in the removable core.

It is readily apparent that said valve 30 as well as the valve pintle 10 can be replaced by a simple pipe which is similar to the pipes 7 and 8. In that case, the function of the device is to provide a simple connection between a plurality of pipes. A core 6 which is employed in this case is illustrated in FIG. 3. Three similar ducts 32, 33 and 34 which are formed in said core communicate with each other and are intended to interconnect three radial passageways corresponding to the pipes through which the fluid is to be circulated.

The core 6 can also be provided with four ducts and thus interconnect the four radial passageways of the support 1 or with only two ducts 32, 34 located at right-angles or with ducts 32, 33 located in the line of extension of each other, depending on the piping systems to be connected.

By reason of the fact that the core 6 is simply inserted in the central recess 4 of the support 1, the change of connection between the elements of a fluid-circuit is readily carried out by slackening-off the end-fittings 14 or the body 15, then withdrawing the core 6 in order to replace this latter with another core having ducts which are disposed differently or in order to place said core in another position after an angular displacement which brings the ducts opposite to the different radial passageways. No disassembly of the installation is necessary since the elements of the fluid-circuit remain in position within the support during displacement of the core.

Figure 4:
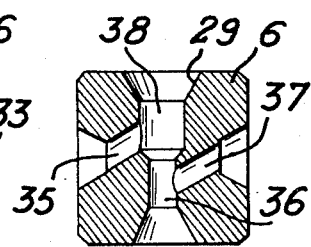

The arrangement of the ducts which are pierced in the core 6 can in fact vary according to the connections to be made. For example, FIG. 4 shows a core 6 having three ducts 35, 36 and 37 of small diameter and a duct 38 of larger diameter which are connected together in pairs. By means of a core of this type, a cock, a valve or any other like device can be connected to three pipes while making it possible to maintain a continuous communication between the two pipes 36 and 37.

Figure 5:
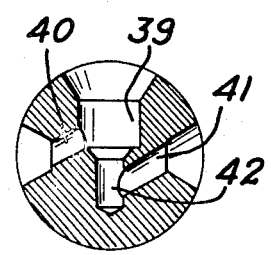

In the case of the core which is illustrated in FIG. 5, two coaxial pipes are controlled by means of a pintle or a valve which is placed within a duct 39 of large diameter. In fact, one of the ducts 40 and 41 which provides a communication with the pipe to be connected opens into the duct 39 whilst the other duct opens into a blind-end extension 42 of said duct. The pintle or valve regulates the admission of fluid into said blind-end duct and controls the circulation between the two coaxial pipes in the same manner as the device of FIGS. 1 and 2 which controls the circulation between two pipes located at right-angles.

It is assumed in the drawings that the support 1 has a parallelepipedal shape and that the recess 4 and the core 6 have the shape of a square-base prism. It is wholly apparent that these shapes depend on the number of pipes to be connected together and that the number of radial passageways varies according to the number of said pipes. In particular, the external shape of the support can be as desired and can even form a U or another similar figure whilst the central recess 4 always has a transverse cross-section in the shape of a regular polygon or possibly a circle in extreme cases. Similarly, the core is either a prism having a base in the shape of a regular polygon and having at least one face which corresponds to each radial passageway of the support, namely a cylinder or even a sphere. The shape of the core and the shape of the recess are preferably similar in order to facilitate positional adjustment of the core within the recess and centering of the ducts with respect to the radial passageways. However, it would not constitute any departure from the scope of the invention if these two elements were to have different shapes; for example, the core 6 can be cylindrical whilst the recess 4 has a prismatic shape.

Since leak-tightness is ensured as a result of contact made between the openings of the core ducts and the extremities of the end-fittings which support the fluid-circuit elements, only the parallel alignment of these two portions of the connector is important. In point of fact, it is observed that good leak-tightness is obtained even when the fluid which circulates within the pipes is at a very high pressure of the order of 7,000 bars.

Different sealing systems could evidently be employed as a function of the fluid-circuit elements, of the nature and pressure of the fluid. Similarly, the materials which constitute the support and the core are determined by the nature of the fluid as well as the pressure and temperature of this latter. These materials are either metals, plastics or the like, depending on the circuits to be connected. Ease of control and replacement of the core always make it possible to ensure effective leak-tightness and guidance of the fluid.

I claim:

1. A connecting device for fluid circuits comprising a support, a central recess of polygonal or circular cross-section opening at both ends through said support, radial passageways in said support opening in said recess, means in said passageways for securing the elements of the fluid-circuit, said passageways being at least equal in number to said elements, a removable non-rotatable core in said recess, ducts in said core for communication with said radial passageways which correspond to the elements to be connected, said core being removable with minimum disassembling of elements of the fluid-circuit.

2. A connecting device in accordance with claim 1, wherein said ducts in said core each terminate in a flared opening coaxial with the corresponding one of said radial passageways.

3. A connecting device in accordance with claim 1 wherein said core and said support are of different materials.

4. A connecting device in accordance with claim 1, wherein at least two elements of the fluid-circuit are pipes terminating in corresponding ones of said radial passageways, one other element of the fluid-circuit being a device for controlling the circulation of fluid within said pipes, said device terminating in one of the other of said radial passageways, said ducts in said core receiving extension ducts for said pipes and said ducts in said core including a duct of larger diameter for said control device, said means for securing the fluid-circuit elements providing mechanical locking between said core, said pipes, said control device and said support.

5. A device in accordance with claim 1 each of said securing means including a threaded end-fitting terminating in a sealing cone engaging within flared openings of said ducts in said core.

* * * * *